Patented Dec. 15, 1936

2,064,524

UNITED STATES PATENT OFFICE 2,064,524

PROCESS FOR OPENING UP COCOA BEANS

Albert Diefenbach, Arlesheim, Switzerland

No Drawing. Application August 12, 1935, Serial No. 35,879. In Switzerland July 21, 1934

5 Claims. (Cl. 99—23)

This invention relates to a process for opening-up cocoa beans. In order to work up cocoa beans into food substances such as cocoa, chocolate and the like, the latter are generally before or after being freed from their husks, shoots and the like, reduced in size, roasted and if required de-oiled and then finely powdered, whereby owing to the roasting a loosening of the tissue elements is brought about which makes the subsequent fine grinding easier.

It has hitherto been proposed to assist this loosening of the tissue elements, before or after the roasting by bringing the tissue elements of the cocoa bean namely cellulose and the like into a finely divided state by chemically acting means such as for example steam, fixed or volatile alkalies. This "opening-up treatment" of the cocoa beans has certain disadvantages the principal of which are unpleasant odours and changes in taste in consequence of the starch becoming pasty and changes occurring in the albuminous constituents.

According to the process of this invention for opening up cocoa beans, the beans are treated with a diluted sugar solution which tends to swell the bean pieces and are thereafter dried, they are then subjected to the usual roasting. Among the sugars which may be used are fructose, grape sugar and caramelized sugar.

Preferably the beans are reduced in size to coarse-grained pieces before the treatment with the solution of a sugar and the treatment preferably takes place so that the cleaned beans which have been reduced in size are soaked in the sugar solution in question for a long time.

By this treatment the sugar solution soaks into the tissue elements of the bean and brings about firstly colloidal-chemical changes such as swelling and adsorption reactions. If the dried material is then subjected to the usual roasting for example heated to 80° C. or 100° C. or to 125 to 130° C. there takes place a range of chemical and colloidal-chemical reactions which consist essentially in that the sugar forms chemical or addition compounds or adsorption compounds which the constituent parts of the beans i. e. with the cellulose, hemi-cellulose, albuminous substances, tanning materials, alkaloids and the like. If a saccharide is used inversion also takes place, if mono-saccharides are used the reversion type of process takes place, in both cases glucoside formation presumably also occurs.

In general the sugar insofar as it does not take part in the above named chemical processes is more or less caramelized or the first formed compounds are further changed.

In consequence of all these reactions there is produced in the bean an especially pleasant aroma without a disturbing flavour arising which was the case with hitherto usual methods of working with alkalies and/or steam. The sugar however, besides the above described chemical reactions also exercises a remarkable physical reaction in that in separating from its solution it bursts open the cells and tissue elements of the bean and lays open the cells and cell constituents. Thereby not only is the de-oiling which takes place after the roasting but also the fine milling made easier, and a product is obtained which easily swells in solution without tending too quickly to deposit.

The beans or the coarse-grained pieces can be subjected to a preliminary roasting before being impregnated with the sugar solution but also in such treatments a roasting takes place after drying as already described. It should be understood that the roasting of the beans must be carried out carefully.

The following examples illustrate how the process of the invention is carried into effect.

1. 100 kgms. of broken up cocoa beans freed from husk parts and shoots are moistened thoroughly with 30 litres of a 50% sugar solution, dried in a roasting drum and lightly roasted.

2. 150 kgms. of broken up cocoa beans freed from husk parts and shoots are lightly roasted, saturated with 40 litres of a 12% solution of fructose. After standing for about 24 hours the mass is dried in a drying chamber and roasted.

The products prepared according to the process of this invention are naturally not yet suitable for use as food substances but must be made suitable by further treatment, such as de-oiling, fine milling, mixing with sugar, fats, aroma materials and the like.

It is to be understood therefore that the sugar treatment according to the invention is carried out at a stage prior to fine milling, and upon the beans while they are whole or coarsely ground.

Having now particularly described and ascertained the nature of my said invention and in what manner the same is to be performed I declare that what I claim is:

1. In a process for opening up cocoa-beans the steps of breaking the cocoa-beans in coarse-grained pieces, saturating the cocoa-bean pieces with a sugar solution, drying the said pieces thus treated, and roasting the pieces.

2. In a process for opening up cocoa-beans the steps of breaking the cocoa-beans in coarse-grained pieces, soaking the pieces in a sugar solution, drying the pieces, and roasting the pieces.

3. In a process for opening up cocoa-beans the steps of breaking the cocoa-beans in coarse-grained pieces, saturating the cocoa-bean pieces with a solution of grape sugar, drying the pieces, and roasting the pieces.

4. In a process for opening up cocoa-beans the steps of breaking the cocoa-beans in coarse-grained pieces, saturating the cocoa-bean pieces with a solution of fructose, drying the pieces, and roasting the pieces.

5. In a process for opening up cocoa-beans the steps of breaking the cocoa-beans in coarse-grained pieces, saturating the cocoa-bean pieces with a solution of caramelized sugar, drying the pieces, and roasting the pieces.

ALBERT DIEFENBACH.